United States Patent [19]

Austin et al.

[11] 4,318,851

[45] Mar. 9, 1982

[54] DISPERSE MONOAZO DYES, THEIR PREPARATION AND THEIR APPLICATION TO SYNTHETIC TEXTILE MATERIALS

[75] Inventors: Peter W. Austin, Bury; Brian R. Fishwick, Cheshire, both of England

[73] Assignee: Imperial Chemical Industries Limited, London, England

[21] Appl. No.: 159,915

[22] Filed: Jun. 16, 1980

[30] Foreign Application Priority Data

Jul. 26, 1979 [GB] United Kingdom ............... 26100/79

[51] Int. Cl.³ ..................... C09B 29/22; C09B 29/06; C09B 29/10; C09B 29/24
[52] U.S. Cl. .................................................. 260/158
[58] Field of Search ........................................ 260/158

[56] References Cited

U.S. PATENT DOCUMENTS

| | | | |
|---|---|---|---|
| 3,428,621 | 2/1969 | Wallace et al. | 260/158 |
| 3,493,556 | 2/1970 | Weaver et al. | 260/158 |
| 3,631,020 | 12/1971 | Weaver et al. | 260/158 |
| 3,639,384 | 2/1972 | Weaver et al. | 260/152 |
| 3,639,385 | 2/1972 | Weaver et al. | 260/158 |
| 3,816,388 | 6/1974 | Weaver et al. | 260/152 |
| 3,829,411 | 8/1974 | Coates et al. | 260/158 |
| 3,910,874 | 10/1975 | Lange | 260/158 |
| 4,036,826 | 7/1977 | Boehmke | 260/158 X |
| 4,101,541 | 7/1978 | Petitpierre et al. | 260/158 |
| 4,141,627 | 2/1979 | Bloom | 260/158 X |

*Primary Examiner*—Paul F. Shaver
*Attorney, Agent, or Firm*—Cushman, Darby & Cushman

[57] ABSTRACT

Disperse monoazo dyes having the formula:

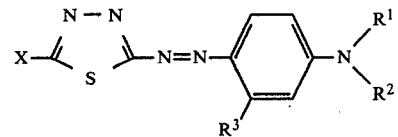

wherein X represents chlorine or bromine, each of $R^1$ and $R^2$ independently represents alkyl or alkenyl and $R^3$ represents hydrogen, alkyl or acylamino.

The dyes give bright red shades on synthetic textile materials.

2 Claims, No Drawings

DISPERSE MONOAZO DYES, THEIR PREPARATION AND THEIR APPLICATION TO SYNTHETIC TEXTILE MATERIALS

This invention relates to disperse monoazo dyes and their application to textile materials.

According to the invention, there are provided disperse monoazo dyes having the formula:

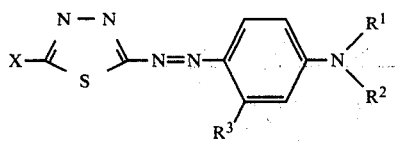

wherein X represents chlorine or bromine, each of $R^1$ and $R^2$ independently represents alkyl or alkenyl and $R^3$ represents hydrogen, alkyl or acylamino.

It is preferred that each of $R^1$ and $R^2$ is lower alkyl.

The term "lower alkyl" used in this specification means alkyl groups containing from one to four carbon atoms. The acylamino groups which may be represented by $R^3$ include groups of the formula —NHCOT wherein T represents hydrogen, lower alkyl or aryl.

The dyes of the invention may be prepared by diazotising a 2-amino-1,3,4-thiadiazole of the formula:

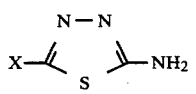

and coupling the resulting diazo compound with an arylamine coupling component of the formula:

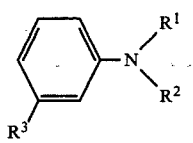

wherein X, $R^1$, $R^2$ and $R^3$ have the meanings given above.

The diazo component may be 2-amino-5-chloro-1,3,4-thiadiazole or 2-amino-5-bromo-1,3,4-thiadiazole. Examples of suitable coupling components include N,N-diethylaniline, N,N-diethyl-m-toluidine, N,N-diethyl-m-aminoacetanilide, N,N-diethyl-m-aminobenzanilide, N,N-diallyl-m-aminoacetanilide and N,N-di-n-butyl-m-aminoacetanilide.

The reactions leading to the formation of the dyes of the invention may be performed using conditions that have been fully described in the prior art for such reactions. Similarly the dyes may be isolated by known methods.

The dyes of the invention are valuable for colouring synthetic textile materials, in particular secondary cellulose acetate and cellulose triacetate textile materials, polyamide textile materials such as nylon 6 and nylon 66 textile materials and, above all, aromatic polyester textile materials such as polyethylene terephthalate textile materials. Such materials can be in the form of filaments, fibres or woven or knitted materials. The dyes may be applied to the synthetic textile materials by any of the methods conventionally employed for the application of disperse dyes to such materials.

When applied to synthetic textile materials, the dyes of the invention give bright red shades having excellent fastness to light and to wet and dry treatments. The dyes also have excellent levelling and build-up properties, particularly on aromatic polyester textile materials. The dyes can also be used for the mass coloration of synthetic polymers which are subsequently to be converted into fibres or filaments or they can be applied to synthetic textile materials by the process of transfer colour printing optionally at reduced air pressures or under wet or humid conditions.

The invention is illustrated but not limited by the following Examples in which all parts are by weight unless otherwise stated.

EXAMPLE 1

0.8 parts of sodium nitrite are added in portions to 9.2 parts of stirred concentrated sulphuric acid of specific gravity 1.84 at such a rate that the temperature rises to 60° C. The mixture is stirred until complete solution is achieved and, after cooling to 5° C., a mixture of 8 parts by volume of acetic acid and 2 parts by volume of propionic acid is added dropwise at such a rate that the temperature does not rise above 15° C. The mixture is stirred and cooled to −5° C. and 1.36 parts of finely powdered 2-amino-5-chloro-1,3,4-thiadiazole are added in portions, followed by the dropwise addition of a mixture of 8 parts by volume of acetic acid and two parts by volume of propionic acid, care being taken to ensure that the temperature does not exceed −5° C. The mixture is stirred at −5° C. for a further 2 hours after which time 0.5 parts of urea are added. Meanwhile 2.2 parts of 3-diethylaminoacetanilide are dissolved by warming in a mixture (by volume) of 8 parts of acetic acid, 2 parts of propionic acid and 1 part of acetic anhydride and then stirred at room temperature for 2 hours during the diazotisation as described above. The solution is then added to a stirred mixture of ice (200 parts), and water (200 parts), and the diazonium salt solution is slowly added during 30 minutes. A further 300 parts of ice water are added and the mixture is stirred for 16 hours, being allowed to warm up to room temperature. The product is collected by filtration, well washed with cold water and recrystallised from methylated spirits m.p. 192°, λmax (in acetone) 519 nm. The dyestuff yields bright mid-red shades on polyester with very good light and wet fastness.

EXAMPLE 2

Replacement of the 1.36 parts of 2-amino-5-chloro-1,3,4-thiadiazole in Example 1 by 1.80 parts of 2-amino-5-bromo-1,3,4-thiadiazole yields a dyestuff m.p. 196° (from methylated spirits), λmax (in acetone) 519 nm which gives bright red shades on polyester with good light and wet fastness.

EXAMPLE 3

Replacement of the 1.36 parts of 2-amino-5-chloro-1,3,4-thiadiazole in Example 1 by a mixture of 0.27 parts of 2-amino-5-chloro-1,3,4-thiadiazole and 1.44 parts of 2-amino-5-bromo-1,3,4-thiadiazole yields a dyestuff mixture inseparable by thin layer chromatography and having m.p. 192° (from methylated spirits), λmax 519 nm which gives bright red shades on polyester with good light and wet fastness.

The Examples in the following table are made by similar methods. Unless otherwise indicated, the melting point is after recrystallisation from methylated spirits and λmax refers to solution in acetone. The last column gives the shade on polyester fibre.

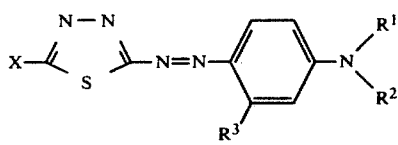

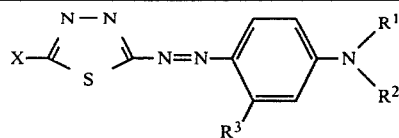

| Example | X | $R^1$ | $R^2$ | $R^3$ | m.p. | λmax | Shade |
|---|---|---|---|---|---|---|---|
| 4 | Br | $CH_2CH_3$ | $CH_2CH_3$ | H | 141° | 510 nm | Scarlet |
| 5 | " | $CH_2CH_2CH_3$ | $CH_2CH_2CH_3$ | " | 160° | 512 nm | " |
| 6 | " | $CH_2CH_2CH_2CH_3$ | $CH_2CH_2CH_2CH_3$ | " | 119° | 514 nm | " |
| 7 | " | $CH_2CH_3$ | $CH_2CH_3$ | $CH_3$ | 169° | 519 nm | Red |
| 8 | " | $CH_2CH_2CH_3$ | $CH_2CH_2CH_3$ | " | 153° | 522 nm | " |
| 9 | " | $CH_2CH_2CH_2CH_3$ | $CH_2CH_2CH_2CH_3$ | " | 121° | 524 nm | " |
| 10 | Cl | $CH_2CH_3$ | $CH_2CH_3$ | " | 169° | 520 nm | " |
| 11 | " | $CH_2CH_2CH_3$ | $CH_2CH_2CH_3$ | " | 151° | 521 nm | " |
| 12 | Br | $CH_2CH_2CH_2CH_3$ | $CH_2CH_2CH_2CH_3$ | $NHCOCH_3$ | 150° | 524 nm | " |
| 13 | Cl | " | " | " | 146° | " | " |
| 14 | Br | $CH_2CH_3$ | $CH_2CH_3$ | $NHCOC_6H_5$ | 195° | 523 nm | Red |
| 15 | Cl | " | " | " | 194° | " | " |
| 16 | " | $CH_2CH=CH_2$ | $CH_2CH=CH_2$ | $NHCOCH_3$ | 166° | 511 nm | Scarlet |
| 17 | Br | $CH_2CH_2CH_3$ | $CH_2CH_2CH_3$ | " | 158° | 524 nm | Red |
| 18 | Cl | " | " | " | 151° | 522 nm | " |
| 19 | Br | $CH_2CH_2CH_2CH_3$ | $CH_2CH_2CH_2CH_3$ | $NHCOC_6H_5$ | " | 526 nm | " |
| 20 | Cl | " | " | " | 149° | " | " |
| 21 | Br | $CH_2CH_2CH_3$ | $CH_2CH_2CH_3$ | " | 156° | 525 nm | " |
| 22 | Cl | " | " | " | 144° | 524 nm | " |
| 23 | Br | $CH_2CH_3$ | $CH_2CH_3$ | $NHCOCH_2CH_3$ | 183° | 520 nm | " |
| 24 | Cl | " | " | " | 181° | 519 nm | " |
| 25 | Br | " | " | $NHCOCH_2CH_2CH_3$ | 184° | " | " |
| 26 | Cl | " | " | " | 182° | 520 nm | " |
| 27 | Br | $CH(CH_3)_2$ | $CH_2CH=CH_2$ | $NHCOCH_3$ | 147° | 518 nm | Red |
| 28 | " | $CH_3$ | $CH_2CH_2CH(CH_3)CH_2CH(CH_3)CH_3$ | H | 80–90° | 509 nm | Scarlet |
| 29 | " | $CH_2CH_3$ | $(CH_2)_5CH_3$ | H | 113–116° | 513 nm | " |

The product of Example 17 is recrystallised from n-propanol instead of methylated spirits. The product of Example 28 softens at about 40° C.

We claim:

1. A disperse monoazo dye having the formula:

wherein X represents chlorine or bromine, each of $R^1$ and $R^2$ independently represents $C_{1-9}$ alkyl or allyl and $R^3$ represents hydrogen, lower alkyl or an acylamino group of the formula:

—NHCOT wherein T signifies lower alkyl or phenyl.

2. A disperse monoazo dye according to claim 1 wherein each of $R^1$ and $R^2$ is lower alkyl.

* * * * *